FAST TEMPORARY CRYOGENIC MEMORIES

Filed July 27, 1964

2 Sheets-Sheet 1

INVENTORS

ALBERT ZYLBERSZTEJN & MAURICE J. MEMORET

BY

Abraham A. Saffitz

ATTORNEY

INVENTORS
ALBERT ZYLBERSZTEJN & MAURICE J MENORET
BY
Abraham A. Saffitz
ATTORNEY United States Patent Office 3,376,560

Patented Apr. 2, 1968

3,376,560

FAST TEMPORARY CRYOGENIC MEMORIES

Albert Zylbersztejn, La Celle-Saint-Cloud, and Maurice J. Menoret, Chatillon-sous-Bagneux, France, assignors to Centre National d'Etudes des Telecommunications, Issy-les-Moulineaux, France, a corporation of France Filed July 27, 1964, Ser. No. 385,160
Claims priority, application France, Aug. 3, 1963, 943,700
4 Claims. (Cl. 340—173.1)

ABSTRACT OF THE DISCLOSURE

A cryogenic memory comprising in combination a cryotron type write-in matrix and a cryosar type read-out matrix is disclosed. The storage elements of the write-in matrix are superconductive loops and the crosspoints of the read-out matrix are cryosars individually disposed in the region where the magnetic field produced by a current flowing through each of said loops is substantially at a maximum.

This invention is for improvements in or relating to fast temporary cryogenic memories, more particularly to the read-out circuits thereof.

Some metals and alloys, known as superconductors, have zero electrical resistance below a critical or transition temperature which depends upon the nature of the superconductor and upon the magnetic field applied to them. An electric pulse applied to such a conductor can be stored as a current which flows continuously around a superconductive loop until a magnetic field strong enough to cancel the superconductivity effect is applied to the loop.

An article by C. J. Krauss entitled, "An evaporated Film-135 Cryotron Memory Plane" published in "Microminiaturization" (proceedings of the Agard conference on microminiaturization, Oslo, July 26–26, 1961, Pergamon Press, Paris, 1962 edition, pp. 252–261) discloses a cryogenic memory which uses these properties for temporarily storing in binary form data for use in an electronic computer. This memory or store comprises two matrices disposed one above another, one for write-in and one for read-out, both of them using superconductivity effects in thin strips of superconductive metals prepared by vacuum metallization on insulating films placed one above another.

The elements for switching circuits of this kind from the superconductive state to the normal or resistive state and vice versa are known as cryotrons and comprise a right-angled crossing between a first superconductive strip and a second superconductive strip separated from one another by a thin insulating layer; the magnetic field produced by a superconductivity current flowing in the first strip makes the second strip resistive by altering its critical or transition temperature to a value below the memory utilization temperature.

The write-in matrix comprises; word circuits formed by rectangular storage or memory loops horizontally aligned to form the words of the memory and joined together in columns by extensions of one of their vertical sides; and magnetic excitation circuits separated from the word circuits by an insulating film and formed by horizontal superconductive strips, each of which crosses the memory loops of any one row to form a write-in cryotron with the vertically extended side of each loop. When a current flows through a row of the magnetic excitation circuits no superconductivity current can flow through the corresponding storage loops whose write-in cryotrons are in the resistive state, and the word which such loops form included only zeroes. Consequently, to write a 1 into a loop, the column thereof has applied to it a current which finds a superconductive path around three sides of the loop shunting the write-in cryotron thereof, whereafter the magnetic excitation current of the row is interrupted to open the cryotron. Once a continuous current is flowing around the loop, the current applied to its column is interrupted.

The read-out circuits comprise two parallel cryotrons for each memory loop. The first of these two, known as the read-out cryotron, is controlled by the magnetic field of the loop current, and the second is controlled by an interrogation or sampling circuit. The application of a current thereto makes the second cryotron resistive. If a current is flowing around the loop, the read-out cryotron is also resistive and a finite resistance representing the digit 1 appears at the terminals of these two cryotrons. If no current is flowing around the loop, there is a superconductive path between the terminals, and the digit detected is zero.

For satisfactory operation of a memory or store of this kind, the control current for each cryotron must be less than the critical current of the circuit bearing the cryotron, i.e., than the current at which the magnetic field produced thereby makes the circuit lose its own superconductivity. To this end, the magnetic excitation circuits for the write-in matrix of such memories are prepared from a metal having a higher transition temperature than the metal forming the word circuits, namely lead and tin respectively. Unfortunately, the read-out circuits are also made of tin and the temperature range over which the read-out cryotrons operate satisfactorily is very limited. Consequently, most known cryogenic memories operate satisfactorily only within a temperature range limited to a few tenths or even a few hundredths of a degree Kelvin.

Another difficulty in using cryogenic memories is the very low internal impedence of their cryogenic read-out matrix.

It is a main object of the invention to improve the usefulness of cryogenic memories.

One object of the invention is to increase the temperature range in which cryogenic memories can operate satisfactorily. Another object of the invention is to provide a cryogenic memory providing read-out signals which are readily usable.

A general feature of the memories according to this invention is that they comprise a write-in matrix using superconductivity phenomena and a read-out matrix using the phenomenon of rapid variation in resistivity of a semiconductive substance experiencing an electric field in dependence upon the applied magnetic field, in the temperature conditions required for such superconductivity phenomena.

The reason for this is that it is known, more particularly from an article entitled "Electrical Conduction in N-Type Germanium at Low Temperatures" by Seymour H. Koenig, Rodney D. Brown and Walter Schillinger, published in the American journal "The Physical Review," vol. 128, second series, No. 4, Nov. 15, 1962, pp. 1168 to 1696, that at low temperatures the conductivity of n-type germanium increases by several orders of magnitude upon a slight increase of the electric field above a critical value of from 4 to 10 volts per centimetre and is an increasing function of the applied magnetic field. The conductivity of n-type germanium at low temperatures and in zero or a small electric field is less in proportion as the germanium is purer, for according to the article just mentioned the only impurities ionised at a temperature below 10° K. are the acceptors and the donors which compensate for them. It is considered that near the critical electric field the mean electron energy is of the same order as the ionisation energy of the donors, and the great increase in conductivity is attributed to increased charge carrier density due to ionisation of neutral impurities by collision with charge carriers of sufficient energy. The effect of a magnetic field can in some respects be compared with the phenomenon of magneto-resistance and delays the growth of conductivity in dependence upon the electric field. Semiconductor device embodying these features are generally called cryosars.

According to the invention the read-out matrix of a cryogenic memory comprising a write-in matrix whose memory elements are superconductive loops is formed by a thin film—e.g., 10 microns thick—of germanium doped with a single n-type impurity having printed on the front vertical metal bands or strips, called read-out columns, earthed through a load resistor, and on the back horizontal metal strips, called interrogation or sampling rows, the intersections between such rows and such columns being disposed opposite the superconductive loops in the region where the magnetic field produced by a current flowing through such loops is at a maximum, so that when an interrogation row is brought to an appropriate potential with respect to earth and therefore to the read-out columns, a potential difference occurs across the load resistors of those read-out columns which intersect the interrogation row at a place opposite a loop through which no current flows, such potential difference being due to the avalanche current through the germanium film and representing the digit 0, whereas when a superconductivity current flows through the corresponding loop, the magnetic field produced by the superconductivity current keeps the germanium film insulating locally and the absence of read-out signal denotes the binary digit 1.

Since the internal impedance of this cryosar type read-out matrix is much greater than for cryotron type read-out matrices, the read-out signals can readily be used in the various data-processing systems which do not use superconductivity effects.

Since a read-out matrix of this kind operates satisfactorily in a much wider temperature range than a write-in matrix of the kind described in the article by C. J. Krauss previously referred to, the write-in matrix determines the range of working temperatures of a cryogenic memory formed by the association of a read-out matrix according to the invention with a write-in matrix of the kind just referred to. Now, an article by J. F. Marchand entitled "A New Type of Parallel Cryotron" published in the American journal "Physics Letters," vol. 2, No. 2, Aug. 15, 1962, pp. 57 and 58, discloses a cryotron comprising two strips of the same metal—tin in this particular case—but of different widths and deposited parallel with one another by vacuum coating on the same insulating surface and operating satisfactorily over a wide temperature range. With this arrangement, a metal having a fairly high transition temperature, such as lead instead of tin can be used to provide a write-in matrix whose operating conditions are well suited to the operating conditions of the read-out matrix according to the invention, so that a cryogenic memory which operates satisfactorily over a wide temperature range can be provided.

The invention will be more generally understood from the following description and from a study of the accompanying drawings wherein.

Figure 1:
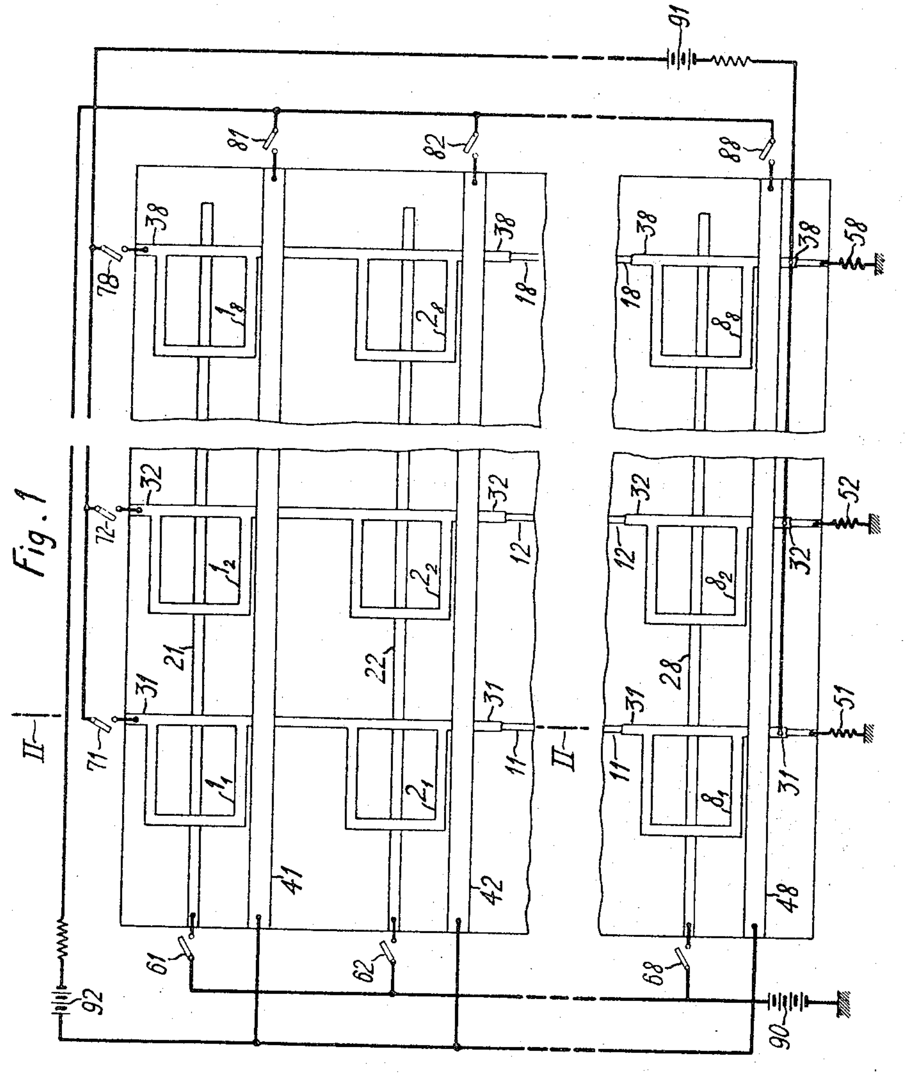
FIG. 1 shows part of a cryogenic memory according to the invention.
Figure 2:
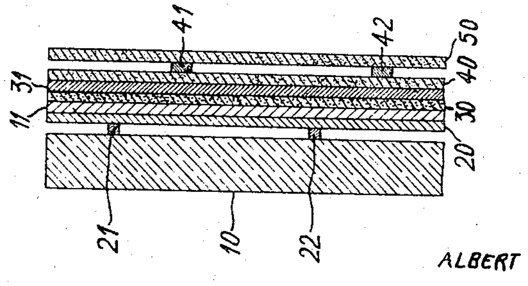
FIG. 2 is a section taken along the line II—II of FIG. 1.

The cryogenic memory shown in FIGS. 1 and 2 comprises a read-out matrix and a write-in matrix placed one above another on a ceramic wafer 10. The read-out matrix is a film 20 of n-type germanium having on its face read-out columns 11, 12–18 of a gold antimony alloy and having on its back, which is applied to the wafer 10, interrogation or sampling rows 21, 22–28 of the same metal. The crosspoints of the read-out matrix are therefore adapted to form distinct cryosars. The write-in matrix is separated from the read-out matrix by a thin layer 30 of silica which makes a very good insulator at the temperature of liquid helium. Two networks of thin strips of lead are provided on either side of another thin silica layer 40. The first such network is disposed between the layers 30 and 40 and comprises rectangular loops or turns $1_1 \ldots 1_8$, $2_1 \ldots 2_8$, $\ldots 8_1 \ldots 8_8$ joined together to form columns by extensions 31, 32 . . . 38 of one of their vertical sides placed above the read-out columns 11, 12–18; the turns $1_1 \ldots 1_8$, $2_1 \ldots 2_8$, $\ldots 8_1 \ldots 8_8$ are so aligned that the interrogation rows 21, 22–28 extend respectively opposite the centre of their vertical sides. The second network, on the other side of the insulating layer 40, consists of thin parallel strips of lead 41, 42–48 which are wider than in the first network and which are placed parallel with one of the horizontal sides of the turns of each row at a very close distance to such sides, to form therewith parallel cryotrons of which the lead strips of the second network are the magnetic excitation lines. The same are covered with a protective silica layer 50.

To produce a memory of this kind, the read-out matrix is formed first, whereafter the interrogation and storage matrix is formed on the surface of the read-out matrix. The n-type germanium film 20 of the read-out matrix is formed by a known process wherein a germanium layer is formed epitaxially on an appropriately cut end orientated block of rock salt. The interrogation rows 21, 22–28 are formed, by the gold-antimony alloy being vacuum metallised through the apertures in an appropriate mask, on the exposed surface of the germanium film while the same is still adhering to the block of salt, whereafter the ceramic wafer 10 is stuck to the same surface. The block of salt is then completely dissolved, and, when the second surface of the film is exposed, the read-out columns 11, 12–18 are formed by metallisation of gold-antimony alloy. The interrogation matrix is then prepared by alternate vapour coating of silica and lead, as is known more particularly from C. J. Krauss' article hereinbefore referred to.

To simplify matters, the memory write-in and interrogation devices shown in FIG. 1 are in the form of sets of switches 61–68, 71–78, 81–88. Via the switches 61–68, each of the interrogation rows 21–28 can have applied to it the potential of a source 90 having one pole earthed; consequently, between the latter rows and the read-out columns 31–38 which are earthed through their load resistors 51–58 delivering the read-out signals, a local electric field can be produced which is strong enough to trigger off an avalanche current through the semiconductive film 20 in the absence of magnetic field but which is not strong enough to trigger off such a current in the presence of the magnetic field produced by the superconductivity current of the corresponding loop. The switches 71–78 are for selecting the columns through which a current is required to flow from a source 91 to write the digit 1 on to a particular row in such columns.

Via the switches 81–88, a current from a source 92 can be applied to each of the magnetic excitation rows 41–48 to make the loops of the corresponding row resistive. The memory is therefore empty when the switches 81–88 are closed. When a word has been formed by the switches 71–78, such word can be written, for instance, into the first row in known manner by the switch 81 being opened—and staying open for as long as the word written-in is to stay in store—whereafter the switches 71–78 are opened.

To give some idea of the size, the dimensions of a cryogenic memory element of the kind hereinbefore described and produced by the process hereinbefore described are given hereinafter by way of non-limitative example.

On an n-type germanium film having a side of 1 cm., eight interrogation rows 40 microns wide and spaced about 1 mm. apart from one another are traced on one side, and eight read-out columns of the same width and spacing are traced on the other side. At the intersections between these rows and columns there are therefore 64 zones which can individually be conductive or resistive at low temperature.

The turns of the write-in matrix are squares on a side of 500 microns, bounded by strips 50 microns wide. The write-in columns are of the same width and spacing as the read-out columns.

The magnetic excitation rows are 100 microns wide and are separated by a 25-micron interval from the horizontal sides of the turns with which they co-operate to form parallel cryotrons.

Figure 3:
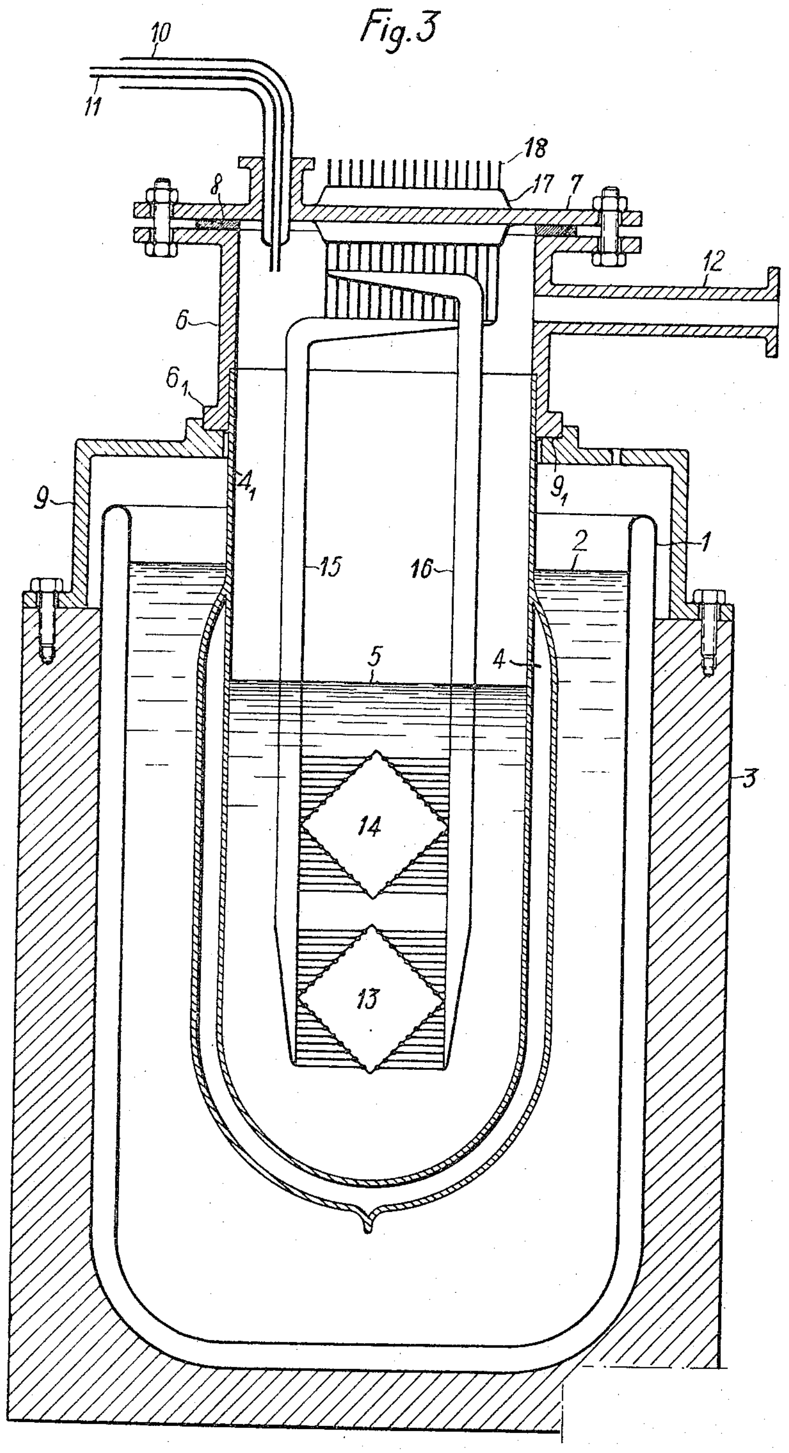
FIG. 3 shows memory elements, such as are shown in FIGS. 1 and 2, in their operative conditions, i.e., immersed in liquid helium in a Dewar flask.

FIG. 3 shows the arrangement of memory elements 13, 14 of the kind hereinbefore described in a known liquid helium cryogenic system formed by a first thermos flask 1 protected by a plexiglas covering 3 and filled with liquid nitrogen 2 in which a second thermos flask 4 containing liquid helium 5 is immersed. The flask 4 is extended by a neck $4_1$ whose mouth-piece is welded to a metal cylinder 6 which caps the mouth-piece and has a bottom reinforcement received in a circular recess in a metal support member 9 so secured to the top of the casing 3 as to maintain the flask 4 on the axis of the flask 1 but at some distance from the base thereof. The support member 9 is not sealing-tight, and so the nitrogen boil-off can escape to atmosphere. The cylinder 6 is closed by a cover 7 with the interposition of a gasket 8.

Liquid helium is supplied through a tube 11 surrounded by a jacket 10 and extending through the cover 7. A high vacuum is maintained in the jacket 10. Helium gas is recovered by pumping through a tube 12 secured to the wall of the cylinder 6.

The elements 13, 14 in the liquid helium 5 are connected to external electrical circuitry by sheets of wires 15, 16 grouped on Teflon strips and extending to a distributor comprising pins 18 embedded in the glass of a support member 17 welded to the metal of the cover 7.

What we claim is:

1. A cryogenic memory comprising in combination a write-in matrix consisting of a plurality of cryotrons with a plurality of superconductive persistent current loops and a read-out matrix consisting of a corresponding plurality of cryosars in which current flowing in each loop operatively controls the corresponding cryosar at the temperature of liquid helium.

2. A cryogenic memory comprising a cryotron-type write-in matrix including superconductive loop memory elements and a read-out matrix consisting of a plurality of crosspoints which are cryosars individually disposed in the region where the magnetic field produced by a current flowing through each of said loops is substantially at a maximum.

3. A cryogenic memory comprising a write-in matrix wherein the binary digits one and zero are respectively registered by a permanent superconductivity current flowing or not flowing through closed loops and a read-out matrix using the phenomenon of rapid variation in resistivity of a semiconductive substance experiencing an electric field in dependence upon the magnetic field locally produced by said superconductivity current, in the temperature conditions required for such superconductivity phenomena.

4. A cryogenic memory comprising a write-in matrix whose memory elements are superconductive loops, means for selectively producing a permanent superconductive current in said loops in order to write the binary digit one in selected memory elements and a read-out matrix formed by a thin film of n-type germanium, first metal strips called read-out columns printed on the front of said film and second metal strips called interrogation rows printed on the back of said film, the intersections between said columns and rows being disposed opposite said superconductive loops in the region where the magnetic field produced by a current flowing through said loops is substantially at a maximum and means for selectively applying an appropriate potential to said interrogation rows with respect to said read-out columns whereby a signal representing the digit zero is provided by the read-out columns which intersect the selected interrogation row at a place opposite a loop through which no current flows, said signal being due to the avalanche current through the germanium film, whereas when a superconductivity current flows thorugh the corresponding loop the magnetic field produced by the superconductivity current keeps the germanium film insulating locally and the absence of read-out signal denotes the binary digit one.

References Cited

UNITED STATES PATENTS

| | | | |
|---|---|---|---|
| 3,077,578 | 2/1963 | Kingston et al. | 307—88.5 |
| 3,078,445 | 2/1963 | Sass | 340—173.1 |
| 3,118,130 | 1/1964 | Rediker et al. | 307—88.5 |
| 3,235,839 | 2/1966 | Rosenberg | 340—173.1 XR |

BERNARD KONICK, *Primary Examiner.*

J. F. BREIMAYER, *Assistant Examiner.*